United States Patent [19]

McCready et al.

[11] Patent Number: 5,565,223
[45] Date of Patent: *Oct. 15, 1996

[54] APPARATUS FOR FORMING MOLDED ARTICLE

[75] Inventors: Derek McCready; Jacek Kalemba, both of Mississauga, Canada

[73] Assignee: Husky Injection Molding Systems Ltd., Canada

[*] Notice: The term of this patent shall not extend beyond the expiration date of Pat. No. 5,383,780.

[21] Appl. No.: 327,655

[22] Filed: Oct. 24, 1994

Related U.S. Application Data

[63] Continuation-in-part of Ser. No. 126,879, Sep. 27, 1993, Pat. No. 5,383,780.

[51] Int. Cl.$^6$ .............................. B29C 45/44; B29D 1/00
[52] U.S. Cl. .............................. 425/556; 249/59; 425/438; 425/443; 425/DIG. 58
[58] Field of Search .............................. 249/59; 425/552, 425/556, 577, 588, 438, 443, DIG. 58

[56] References Cited

U.S. PATENT DOCUMENTS

| | | | |
|---|---|---|---|
| 2,992,577 | 7/1961 | Marxen | 425/438 |
| 3,712,786 | 1/1973 | Aoki | 425/438 |
| 3,856,255 | 12/1974 | Holzman | 249/59 |
| 4,059,249 | 11/1977 | Galer | 249/59 |
| 4,130,264 | 12/1978 | Schroer | 249/180 |
| 4,155,698 | 5/1979 | Aichinger | 425/556 |
| 4,496,302 | 1/1985 | Brown | 425/43 |
| 4,652,227 | 3/1987 | Aoki | 425/191 |
| 4,881,892 | 11/1989 | Webster et al. | 249/59 |
| 5,061,168 | 10/1991 | Fox | 249/59 |
| 5,135,700 | 8/1992 | Williams et al. | 425/438 |
| 5,383,780 | 1/1995 | McCready et al. | 249/59 |

Primary Examiner—James P. Mackey
Attorney, Agent, or Firm—Bachman & LaPointe, P.C.

[57] ABSTRACT

Apparatus includes a female mold and a mold core cooperating with the female mold to form a mold cavity therebetween in the mold closed position for the formation of a threaded, mold article therein. A movable, rotatable stripper ring is provided over the core, and the stripper ring is rotated from a rearward to a forward position and thereby remove the threaded article from the mold core by rotating same.

13 Claims, 14 Drawing Sheets

APPARATUS FOR FORMING MOLDED ARTICLE

CROSS-REFERENCE TO RELATED APPLICATION

This application is a continuation-in-part of U.S. patent application Ser. No. 08/126,879, filed Sep. 27, 1993, now U.S. Pat. No. 5,383,780.

BACKGROUND OF THE INVENTION

The present invention resides in an apparatus for forming a molded plastic article, as plastic closures, particularly threaded molded articles, and particularly for removing said article from the mold.

The art of injection molding plastic closures is well known in the industry. Dependant upon the design of the plastic closure, including the thread type and number of complete threads, it may be ejected from the mold in a variety of ways. If the plastic material being molded is flexible or resilient it may be stripped by a commonly known stripper ring pushing the article off the core. The molded part must be solidified enough not to be folded over onto itself during ejection but sufficiently elastic to return to essentially its original molded shape after the threads have been stretched over the core. If the molded material does not possess the appropriate characteristics of flexibility for this most economical and simple method of ejection, the article will be damaged or may not return to its original shape and size. Similarly, a very defined or deep thread profile may be inherently prone to stripping damage. Also, the part may have other delicate or fragile features such as a commonly known tamper evident ring, which could be damaged even if an otherwise acceptable plastic is being injection molded.

For such situations where the molded part will be too rigid or fragile to simply push off the core, a collapsible core could be used such as the type shown in U.S. Pat. No. 4,130,264. This patent shows a plurality of thread forming segments situated around the periphery of the core which move on tracks to collapse the core inwardly, so that the molded article can easily be pushed off.

In the case of molding a cap having an integral tamper evident ring, an alternative method is shown in U.S. Pat. No. 4,155,698. Here the first female portion of the cavity which surrounds the threaded portion of the closure is removed from the molded closure, while a second female portion adjacent the tamper evident ring stays in place. The core is then retracted while the closure stretches elastically over it. This is possible because the closure device is held fast by the second female portion in the region of the tamper evident ring. The part can then be ejected by a core pin pushing on the inside of the closure or cap, as the inward elastic yielding of the fragile tamper evident ring is permitted.

When molding a plastic resin which is too rigid to be stripped from the threaded portion of the cavity, without permanent deformation of the molded article, one may use a method as shown in U.S. Pat. No. 4,652,227. In this patent, an unscrewing chuck is used to come over the molded part once the female portion of the cavity is removed. The chuck grasps the outer feature of the closure, then rotates the closure as it moves slidably backward to facilitate the axial movement of the unscrewing closure. The patent also teaches that the unscrewing function can be accomplished, separately and simultaneously, outside of the molding area so as not to delay the injection molding of more closures. This method has the advantage of a simpler mold design which requires no moving parts for ejection of the article; however, the unscrewing system can become quite complicated and costly as it is virtually a machine unto itself.

Another method of unscrewing is accomplished by first separation of the mold halves (opening the mold), then rotating the core portion of the mold cavity while a stripper ring or bottom forming portion of the article moves slidably forward in timed relationship with the axial movement of the closure, until the closure is clear of the core portion and allowed to fall free from the molding area. The stripper ring will often employ protruding features, such as teeth or notches, which will keep the molded article from turning in the direction of the rotating core. The stripper ring may be moved forward by a sliding cam attachment that is linked to the rotation drive of the core, thereby ejecting the closure from the core. The sliding cam acts as a wedge by forcibly prying the stripper ring or stripper ring plate forward during the ejection of the article.

This approach carries with it various disadvantages and short-comings. If the core rotation means (rack) and stripper ring plate movement means (cam) are directly linked to a motive means which in turn is not directly linked to the mold closing means (injection machine clamp), there is the likelihood of collision damage should the mold closing means complete its task before the stripper ring return means. To eliminate this possibility, the stripper ring return means must be completed in sequence before the mold closing begins. These non-simultaneous movements can undesirably add one or two seconds to the entire mold cycle time.

A further disadvantage of the system is found in the molded article cooling time required.

For example, if water cooling is desired in the core portion to hasten solidification of the injected plastic, it is necessary to employ rotary water seals around the core to prevent water leaks. These seals will wear out with time due to rotational friction and must be replaced before the imminent leak occurs. In addition, the cores typically have a small drive gear (to maintain overall compactness) which restricts the water channel size in the core. A further disadvantage is evidenced in that the core portion is long and slender and as such, it is prone to wobble as it rotates, causing premature wear on the mating stripper ring surface. Even if the core does not wobble, wear is seen between the core and stripper ring mating surfaces because the core begins to turn while still in contact with the stripper ring. This is because the core rotation and stripper ring plate move simultaneously under directly connected mechanical force. The resultant wear causes a gap between the normally shut-off surfaces between the stripper ring and the core and allows the plastic melt to squeeze into the space (commonly known as "flashing" of the part). Costly repairs and down-time are the result of this occurrence. Of course, gear wear is also to be expected as the rack is used to drive the core rotation for the ejecting of the article as well as for the reregistering of the rack into its original position, ready for the next ejection stroke. Still a further disadvantage includes the excessive overall length of the core assembly, which incurs higher material costs and manufacturing difficulty, as well as limiting the number of available injection molding machines with sufficient clamp stroke to accept the overall mold shutheight. This has been found to be especially true for multi-level or stack molds.

It is, therefore, the principal object of the present invention to provide an improved apparatus for forming a threaded, molded article, as a plastic closure and particularly for removing said article from the mold.

It is a further object of the present invention to provide an improved apparatus as aforesaid which is compact and durable and is capable of more rapid production without undue wear.

It is a still further object of the present invention to provide an apparatus as aforesaid which permits a mold core cooling channel of maximum size.

Further objects and advantages of the present invention will appear hereinbelow.

SUMMARY OF THE INVENTION

In accordance with the present invention, the foregoing objects and advantages are readily obtained.

The apparatus of the present invention comprises:

a female mold having a mold surface for the formation of the outer surface of a molded, plastic article;

a mold core having an external core surface cooperating with the female mold to form a mold cavity therebetween in the mold closed position, said mold core being so constructed to form a threaded inner surface of said molded article in the mold closed position;

means for injecting plastic material into said mold cavity;

means for relatively moving the female mold to a position spaced from the mold core to space the female mold from the molded article and form a mold open position;

a movable, rotatable stripper ring fitted over the external core surface having a rearward and forward position and being in contacting relationship with the threaded article in the mold open position; and means to rotate and axially move the stripper ring from the rearward to forward position thereof and thereby remove the threaded article from the mold core by rotating same.

The article may have a smooth external surface or axially oriented features such as ribs or serrations and the means for relatively moving the female mold is operative to move same away from the mold core and article thereon. Also, the molded article is preferably a threaded closure or cap with a flat, shaped or open upper portion and a side wall or skirt portion thereof depending therefrom, wherein the rotatable stripper ring forms a part of the mold cavity between the core and upper portion in the mold closed position, as for example, contacting the base of the skirt in the mold closed position.

The mold core is advantageously stationary and includes cooling channels therein with means for introducing a cooling medium into the cooling channels. Because the mold core is stationary, the cooling channel may be of maximum size. Also, the water seals which may be required are static and not prone to leakage.

The apparatus includes driving means connected to the stripper ring for rotational driving of the stripper ring. The driving means preferably includes a rack which drives a pinion which in turn drives the stripper ring, and means to reciprocate the rack, whereby the stripper ring moves axially relative to the core and is rotated from the rearward to forward position thereof to remove the article from the core and is returned to the rearward position. Alternatively, the rack can engage a clutch assembly fitted on the stripper ring directly without the use of a pinion. Advantageously, the driving means includes a clutch operative to prevent rotational movement of the stripper ring when the driving means is returned to the rearward position. Such a clutch would also be advantageous in any rotating core type unscrewing mold. Additionally, the motive means for axial movement of the stripper ring provides that should the mold close before the stripper ring is moved independently to its rearward position, there is submission to the force without damage to mold components. The motive force for the stripper ring axial movement in this case is a spring or pneumatic piston or other such means which provides motive energy that can be overcome and compressed without damage. Furthermore, since the pneumatic piston or other means is not directly or mechanically connected to the means for rotating the stripper ring, it can be actuated to independently relieve the contact between the core and stripper ring shut-off surfaces to facilitate a small clearance between them before stripper rotation begins, resulting in reduced wear between the mating surfaces. This feature is not restricted to molds where the stripper ring is rotated but can also be employed on any rotating-core type unscrewing molds.

Preferably, one rack is engageable with multiple pinions and one pinion is engageable with multiple stripper rings.

The present invention may also be used to obtain a closure with a tamper ring.

The present invention particularly includes an apparatus for forming a threaded molded plastic article with an outer surface thereof which comprises: a female mold having a surface for the formation of the outer surface of said molded plastic article; a mold core having an external core surface cooperating with said female mold to form a mold therebetween, said mold having a mold closed position and a mold open position, said mold core and female mold forming a mold cavity in the mold closed position, said mold core being so constructed to form a threaded inner surface of said molded article in the mold closed position; means for injecting plastic material into said mold cavity; means for relatively moving said female mold to a position spaced from the mold core to space the female mold from the molded article and form a mold open position; and means to remove the molded article from the mold core including a clutch, operative to provide rotational driving forces in one direction only.

In addition, the present invention particularly includes an apparatus for forming a threaded molded plastic article with an outer surface thereof which comprises:

a female mold having a surface for the formation of the outer surface of said molded plastic article; a mold core having an external core surface cooperating with said female mold to form a mold therebetween, said mold having a mold closed position and a mold open position, said mold core and female mold forming a mold cavity in the mold closed position, said mold core being so constructed to form a threaded inner surface of said molded article in the mold closed position; means for injecting plastic material into said mold cavity; means for relatively moving said female mold to a position spaced from the mold core to space the female mold from the molded article and form a mold open position; and removal means for removing said article from said mold core, including a cam connected to a rack and spaced therefrom, wherein the cam and rack are operative to move together while still permitting limited axial movement of the stripper ring independent of the movement of said cam and said rack.

Alternatively, and desirably, clutch 60 may be fitted over the stripper ring itself and driven directly by a rack without the inclusion of a pinion in the assembly.

Additional features and advantages of the present invention will appear hereinbelow.

BRIEF DESCRIPTION OF THE DRAWINGS

The present invention will be more readily understandable from a consideration of the following exemplificative drawings, wherein.

DETAILED DESCRIPTION OF PREFERRED EMBODIMENTS

Figure 1:
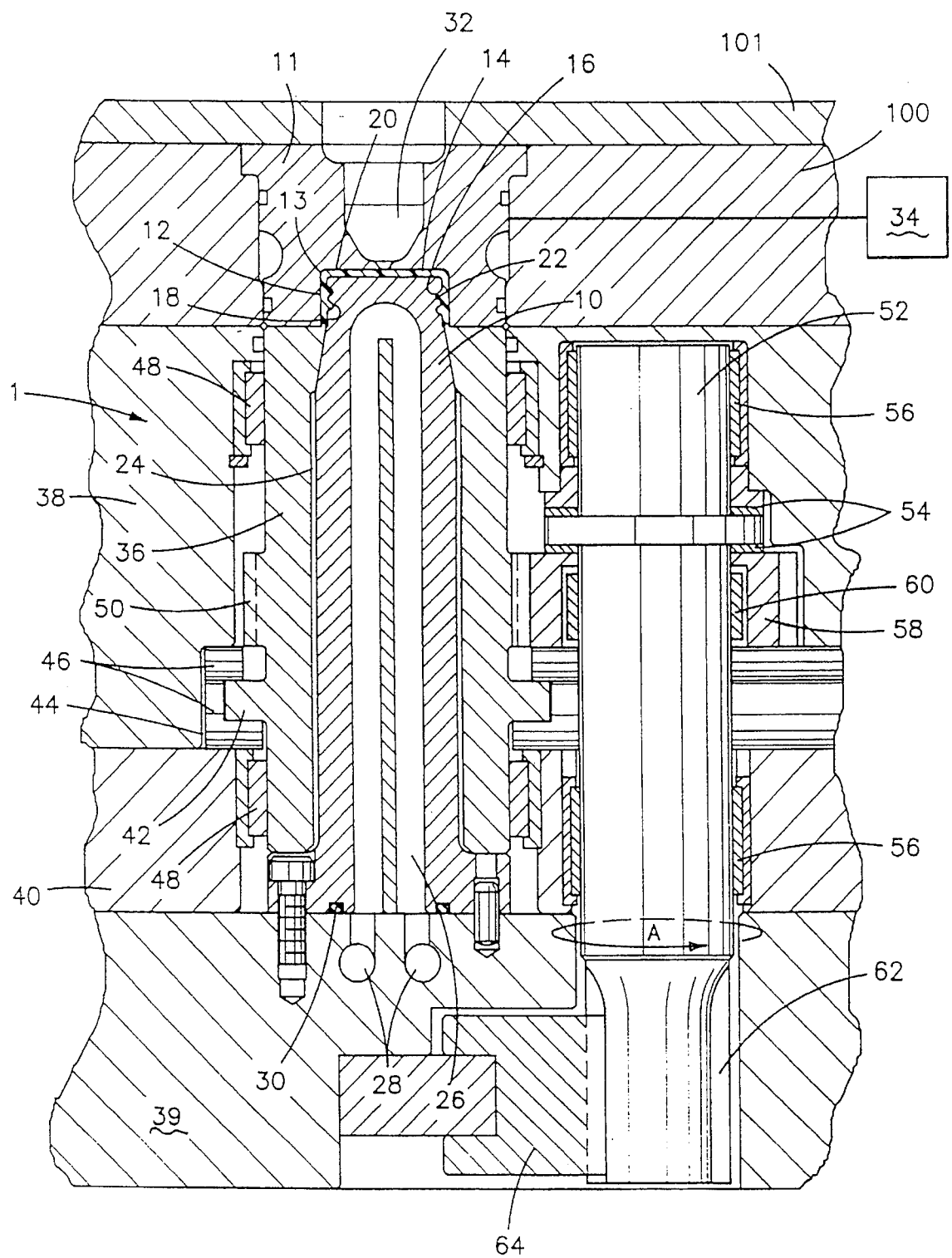
FIG. 1 is a sectional view of a core and mold assembly in the mold closed position.

FIG. 1 shows an apparatus of the present invention comprising a mold cavity assembly 1 in the mold closed position including mold core 10 cooperating with female mold 11 to form a mold cavity 12 therebetween, with female mold 11 having a mold surface 13 for the formation of the outer surface of molded plastic article 14 formed in mold cavity 12. Mold core 10 has a grooved surface 16 adjacent mold cavity 12 in the mold closed position for the formation of a threaded inner surface 18 on molded article 14. Naturally, the particular threaded design may vary depending on requirements.

Molded article 14 may be a threaded closure or cap with a flat, shaped or open upper portion 20 and depending skirt portion 22.

Mold core 10 is an elongated hollow core with an external core surface 24 having cooling channels 26 therein supplied by cooling inlet means 28 in fixed core plate 39 for introducing a cooling fluid, as water, into the cooling channels so that the mold core and molded article may be rapidly cooled. A static O-ring type water seal 30 may surround the cooling passages. Because the mold core is stationary, its design features permit a cooling channel or channels of maximum size for greatest efficiency in the solidification of the plastic product. Furthermore, the seal 30 is static and not prone to wear or leak.

Injection means 32 are provided for injecting molten plastic material into mold cavity 12, as an injection nozzle fed from a source of molten plastic (not shown) for the formation of molded article 14 in the mold cavity. Motive means 34, shown schematically in FIG. 1, are provided for moving mold 11 towards and away from mold core 10 to respectively form the mold closed (FIG. 1) position and mold open (FIG. 2) position. Alternatively, core 10 may be moved towards and away from female mold 11, or both the core and female mold may be moved. As shown in FIG. 1, the molded article 14 desirably has a smooth external surface but may also have axial serrations or the like so that the motive means 34 is operative to move mold 11 axially, in a straight line, towards and away from mold core 10.

Annular stripper ring 36 is fitted over the external core surface 24 and is retained between the front bearing plate 38 and rear bearing plate 40 by sandwiching the flange portion 42 of stripper ring 36 in front bearing plate recess 44 using wear plates 46. Centering alignment of stripper ring 36 is provided by needle bearings 48 placed on opposite ends of the stripper ring. The stripper ring also has gear teeth 50 which are used for rotational driving of the stripper ring. The gear teeth are preferably located midway between the needle bearings for best support.

Figure 2:
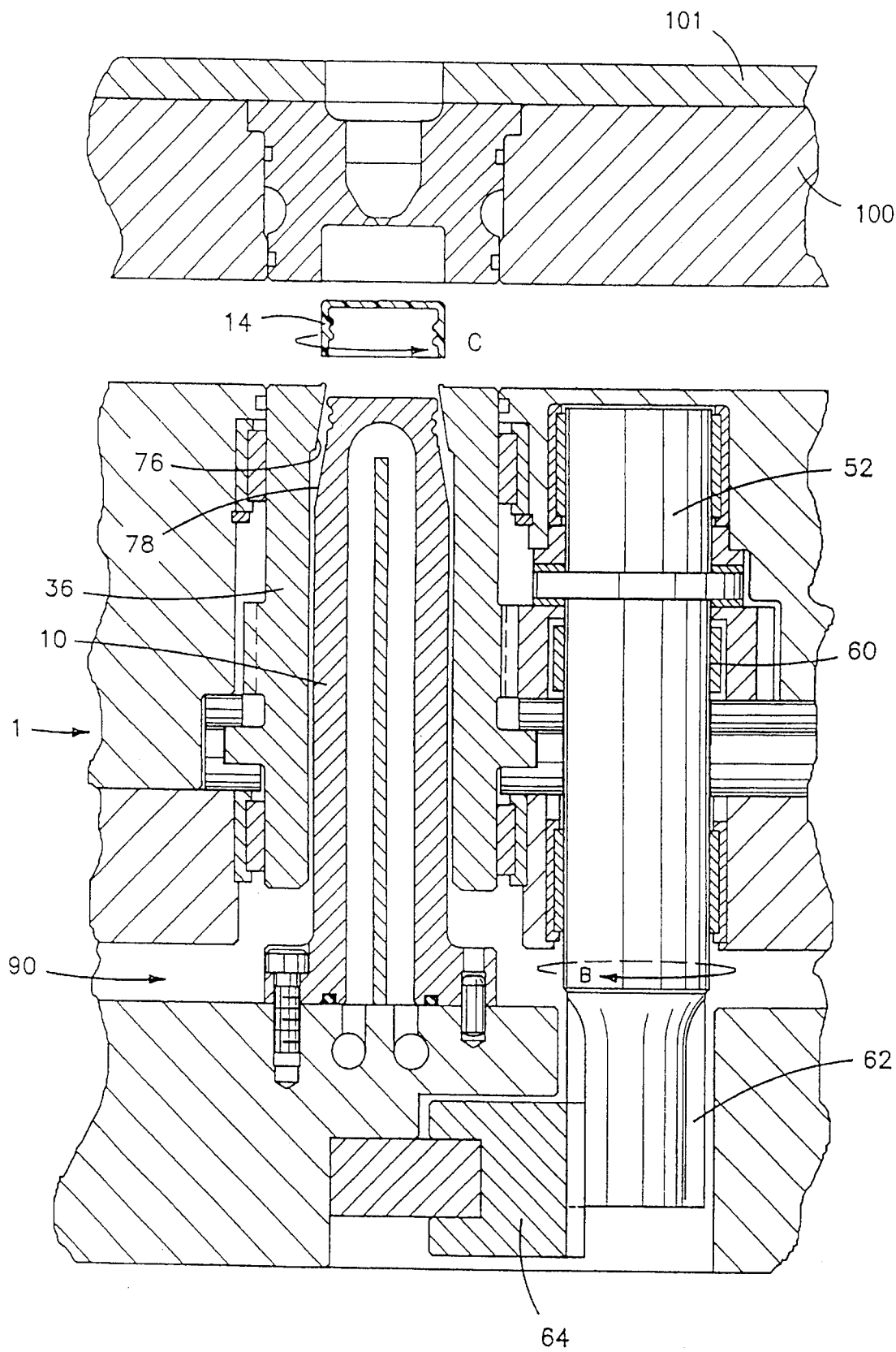
FIG. 2 is a view similar to FIG. 1 in the mold open position.
Figure 12:
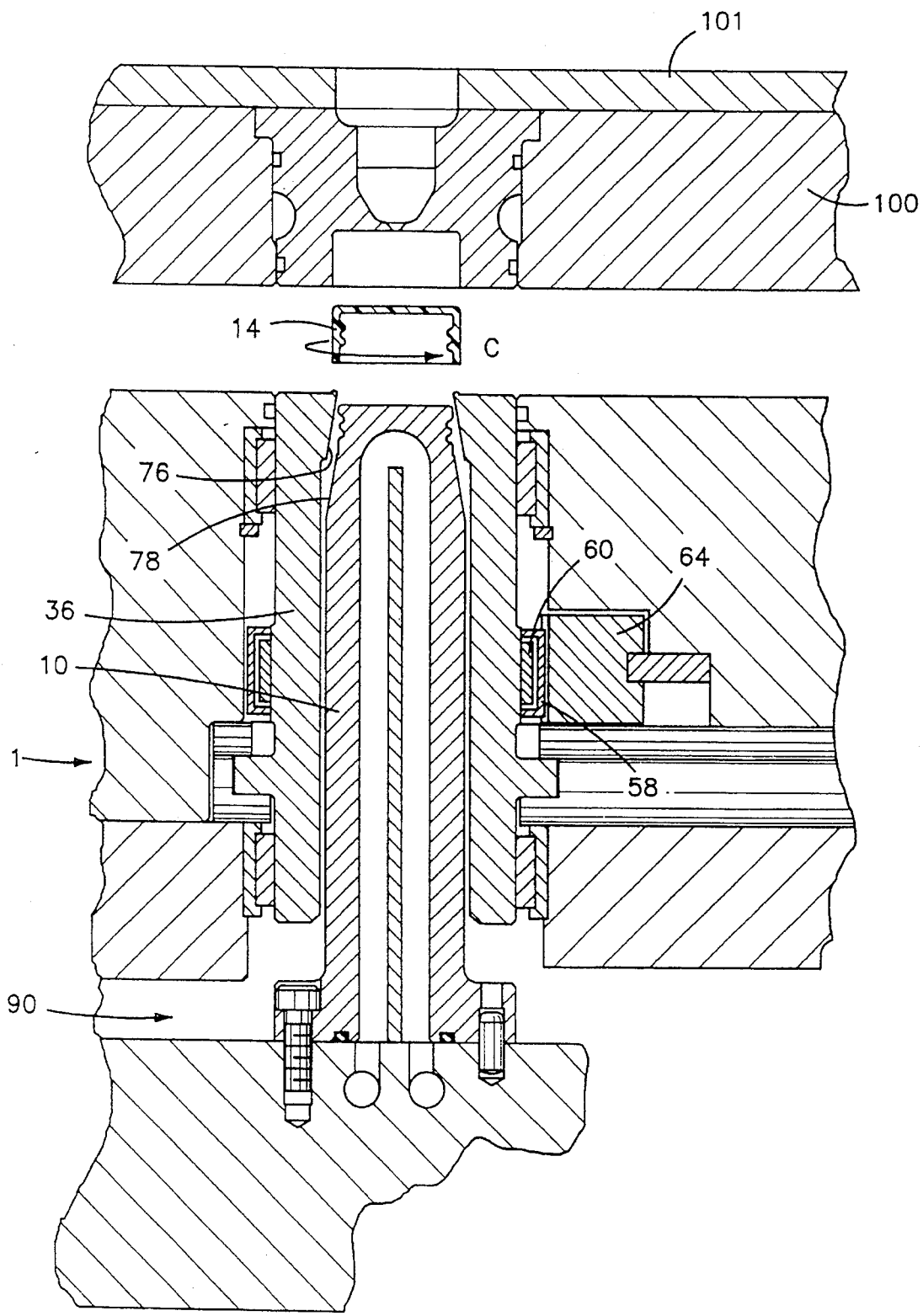
FIG. 12 is a view similar to FIG. 2 showing an alternate embodiment.
Figure 13:
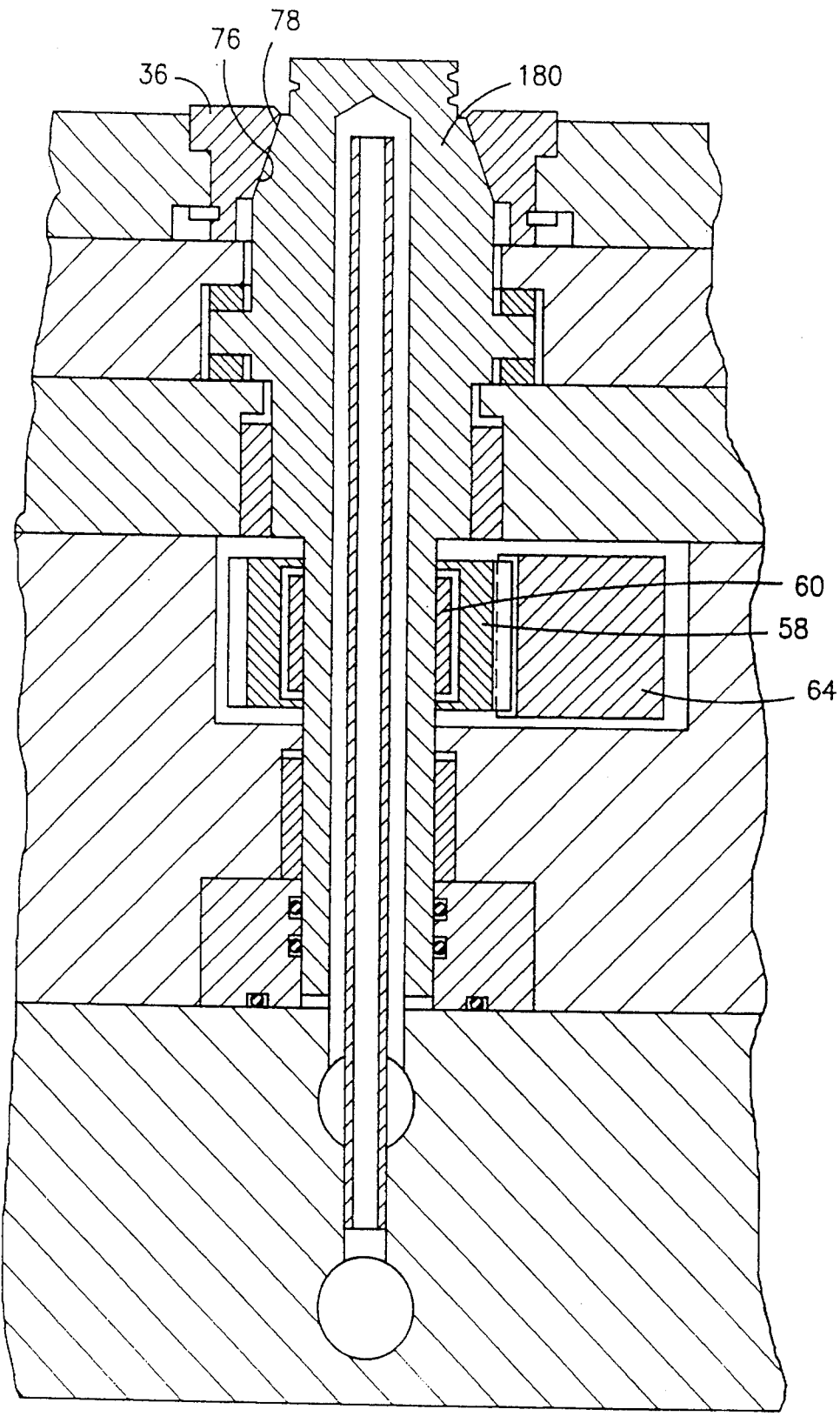
FIG. 13 is a view similar to FIG. 1 showing a still further embodiment.

Pinion 52 is fitted in the front 38 and rear 40 bearing plates using thrust bearings 54 and needle bearings 56. Pinion gear 58, which engages stripper ring gear 50, is fitted with clutch 60. The pinion gear and clutch are fitted over the pinion into engagement with the stripper ring gear. The rear portion of pinion 52 also has a gear tooth configuration 62 or a separate gear mounted on the pinion which is engaged with a gear rack 64 used to initiate rotation of the stripper ring 36, as shown by arrow B in FIG. 2 and to move stripper ring 36 to its forward position as shown in FIG. 2, and as shown by arrow A in FIG. 1 to move stripper ring 36 to its rearward position as shown in FIG. 1. Front and rear bearing plates 38 and 40, respectively, adjoin fixed core plate 39 in the mold closed position shown in FIG. 1 and are spaced therefrom by space 90 in the mold open position shown in FIG. 2. Alternatively, clutch 60 with pinion gear 58 attached may be fitted over the stripper ring itself and driven directly by a rack without the inclusion of a pinion in the assembly as shown in FIG. 12. As previously mentioned, the clutch can also be employed on any rotating core mold with similar advantages. FIG. 13 shows this embodiment, where rotating core 180 is fitted with clutch 60 which has pinion gear 58 attached. Rack 64 has gear teeth directly meshed with the pinion gear and thereby provides direct rotational force for the core. The clutch 60 is operative to permit driving forces to the core 180 in one direction only, as previously discussed, so that the rack 64 can be reset to the start position for part ejection independently of the position of stripper ring 36, without concern for wear or friction at the shut-off surfaces 76 and 78. Additionally, the advantage of time savings is observed, as the mold can be closed immediately after the ejected parts have cleared the molding area, without waiting for the racks to be reset.

Figure 3:
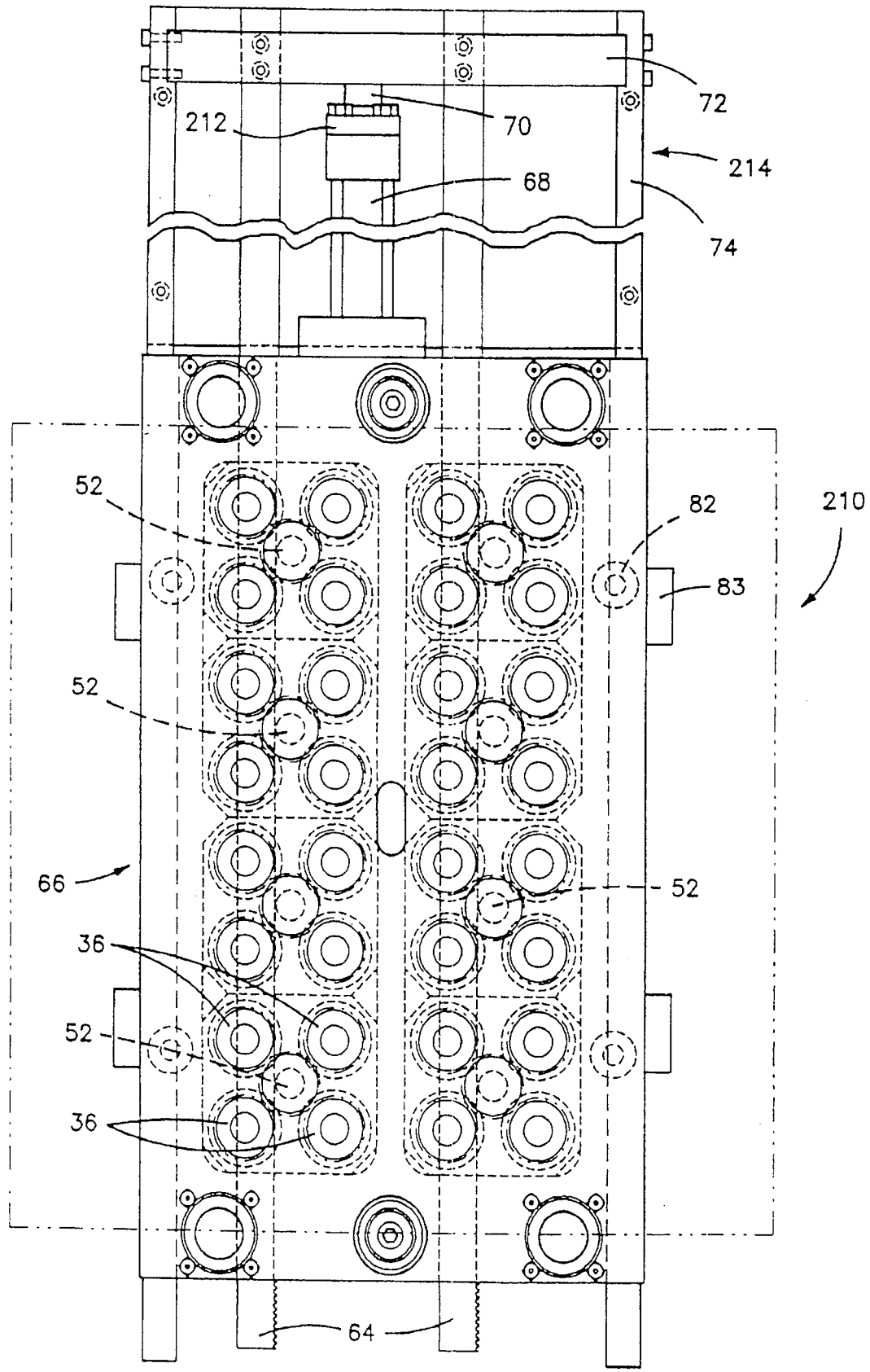
FIG. 3 is a front view of a 32 mold cavity layout using the assembly of FIG. 1.

FIG. 3 shows a front view of a representative mold cavity assembly 66 using the assembly of FIG. 1 wherein rack 64 is placed vertically through the mold cavity assembly 66 engagable with multiple pinions 52, which in turn are engagable with four stripper rings 36 each. It is naturally possible to vary this arrangement based on particular requirements, for example, the pinion can engage only one or two or more stripper rings, based on the size variables of the molded article, pinion, stripper ring and mold layout. Other means known in the art may be used to rotate the pinions or stripper rings. Racks 64 are reciprocated by one or more hydraulic cylinder 68 or other desired means, which is fastened at its base to the top of the mold. The rack 64 and cylinder rod 70 are attached in assembly using cross member 72. Also, attached to cross member 72 is cam 74. FIG. 3 shows the cylinder rod 70 in the retracted position with the racks pulled down. Movement of the cam 74 and rack 64 together via crossbar 72 provide the correct timing of forward and rotational motion for the given molded article 14 and thread pitch thereof.

Figure 6:
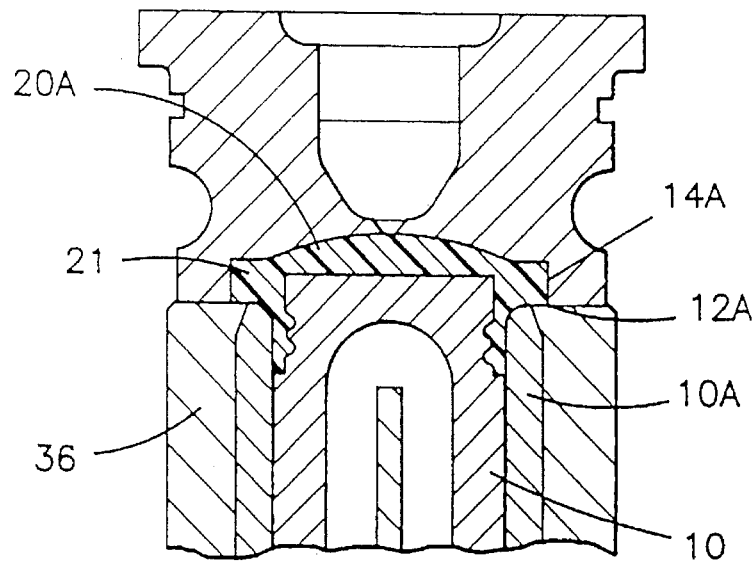
FIGS. 5 and 6 are partial sectional views of alternate embodiments.
Figure 5:
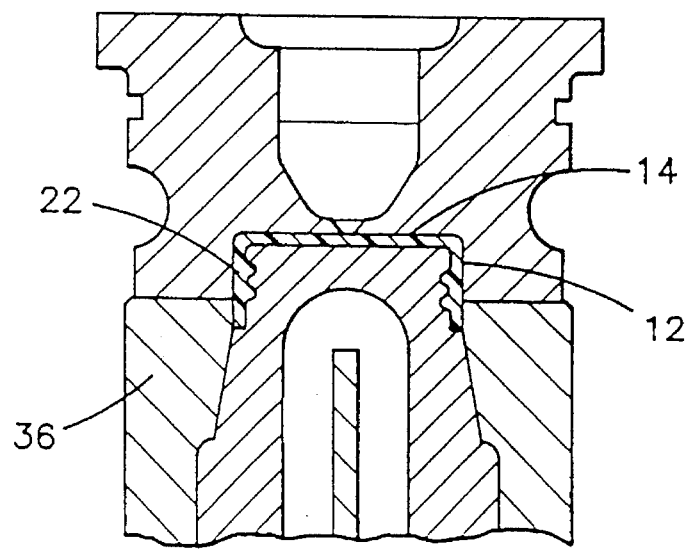

In operation, once the plastic has been injected and solidified, as shown in FIG. 1, the mold opens via motive means 34 to move female mold 11 away from mold core 10, the mold assembly 1 is in the mold open position and the molded article 14 remains on the core. As shown in FIG. 1, stripper ring 36 preferably forms a part of the base of mold cavity 12 in the mold closed position and contacts the base of the skirt 22 of molded article 14. Alternatively, as shown in FIG. 5, stripper ring 36 may form a part of the side of mold cavity 12 and contact the side of skirt 22 of molded article 14. The stripper ring removes the article by inward pressure thereon due to the angular configuration of the forward portion of the stripper ring adjacent the molded article, alternatively assisted by air pressure. A further alternate embodiment is shown in FIG. 6 wherein molded article 14A includes an upper portion 20A with an outer flange portion 21. In this embodiment, stripper ring 36 forms a part of mold cavity 12A adjacent flange portion 21 and removes the molded article 14A by pressure on the flange portion 21. Core 10 may optionally include core sleeve 10A which facilitates manufacturing of the core section.

Figure 4A:
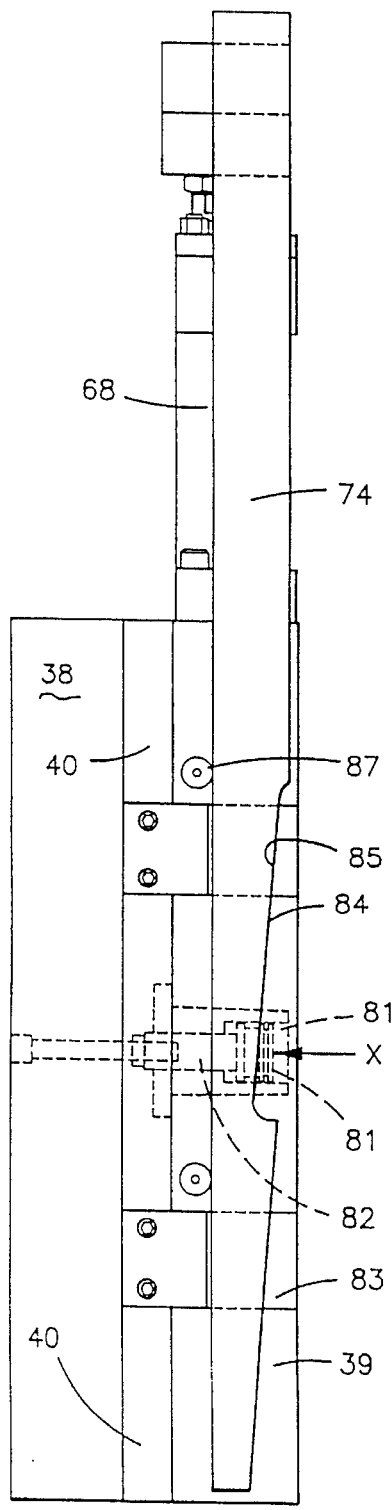
FIGS. 4A, 4B and 4C are side views of the layout of FIG. 2 in different stages of operation.
Figure 4B:
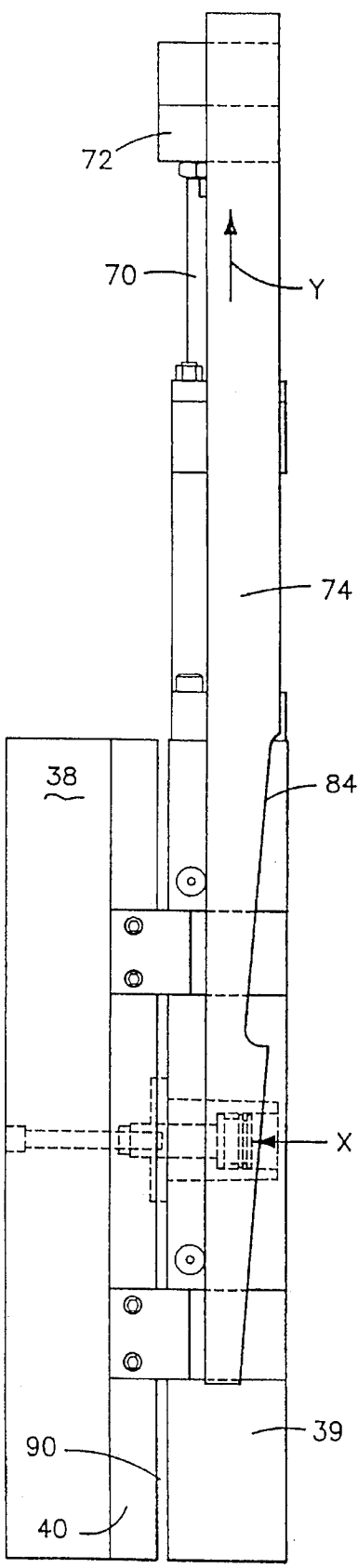
Figure 4C:
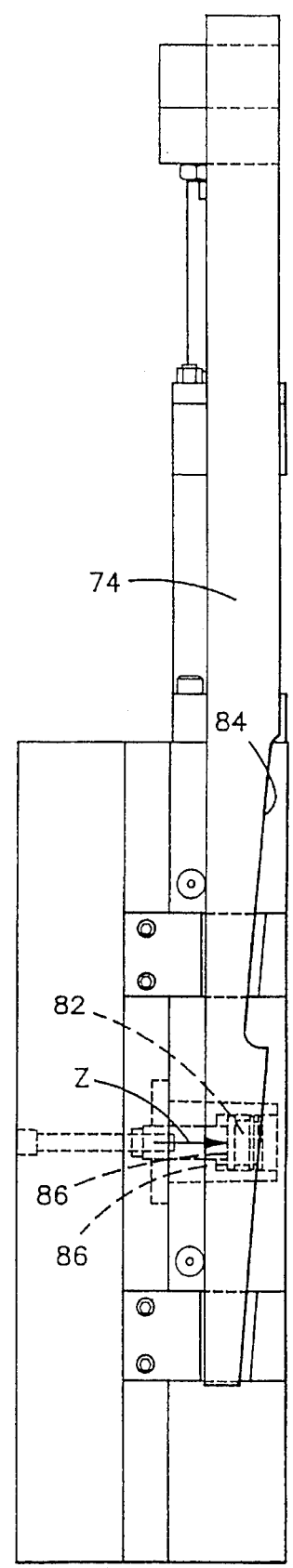

FIGS. 4A, 4B and 4C show side views of the layout of FIG. 2 in various stages of operation. The rack 64 (not shown in FIG. 4), cam 74 (both associated with hydraulic cylinder 68) and fixed pneumatic piston 82 (see FIGS. 3 and 4 and the enlarged detail views of FIGS. 7 and 8) are then activated substantially simultaneously, or preferably with the pneumatic piston activated slightly before to affect a small clearance between the core 10 and stripper ring (36), to turn the pinion 52 and stripper ring 36 and advance the stripper ring forward at a predetermined rate governed by the angle of cam face 84 as it slides against cam follower 83. The effect of pneumatic piston 132 is to hold cam face 84 in contact with cam follower 83. A slight clearance between the cam and cam follower in their initial (mold closed) position will allow the pneumatic piston to initiate clearance between the core and stripper ring before rotation starts. Cam follower 83 is fixed to the rear bearing plate 40 as shown in FIG. 4. This action serves to unscrew article 14 from mold core 10. FIG. 2 shows stripper ring 36 in its forward position with article 14 released from core 10 by rotation thereof in the direction of arrow C. The stripper ring and mold can now be returned to their mold closed position independent of the rack and cam assembly as shown in FIG. 4, saving time in the operation. If the pneumatic piston 82 has not been energized to move the stripper ring back before the mold closes, no damage will occur due to the compressive spring nature of the pneumatic piston 82. As the rack-cam assembly moves back to its home position, clutch 60 allows the stripper ring to remain stationary without rotation thereof and without the resultant wear between gear teeth or mold shut-off surfaces 76, 78.

Figure 8:
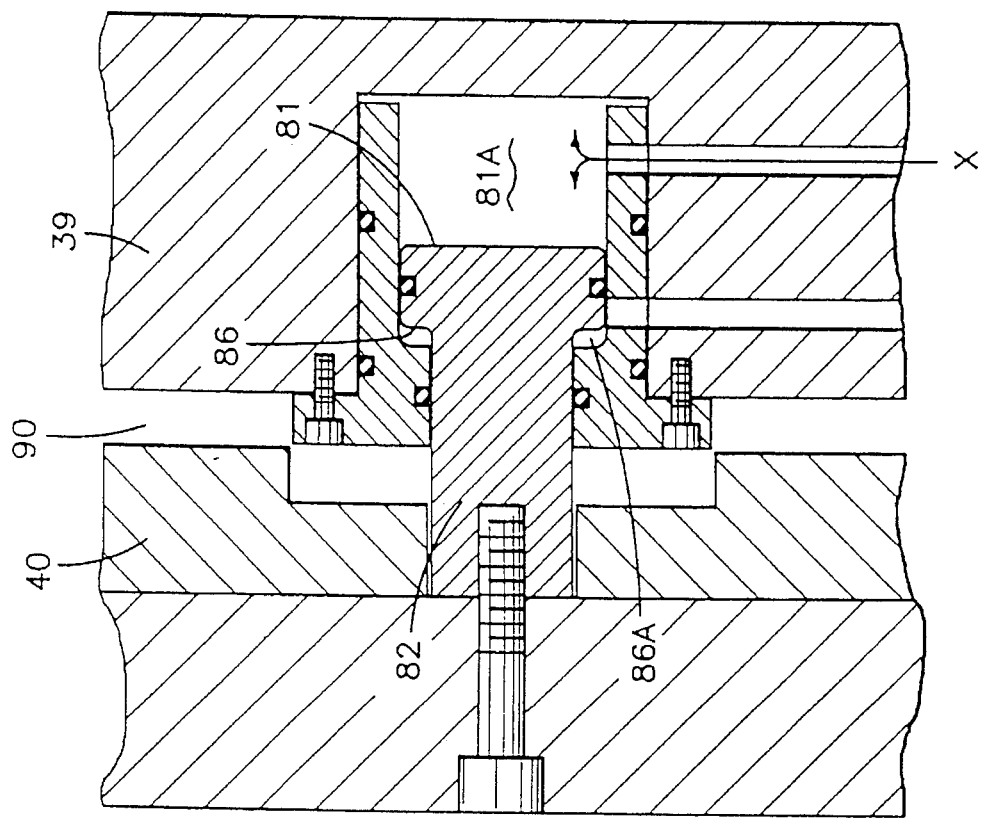
FIGS. 7 and 8 are enlarged detail views of the piston arrangement for moving the front and rear bearing plates.
Figure 7:
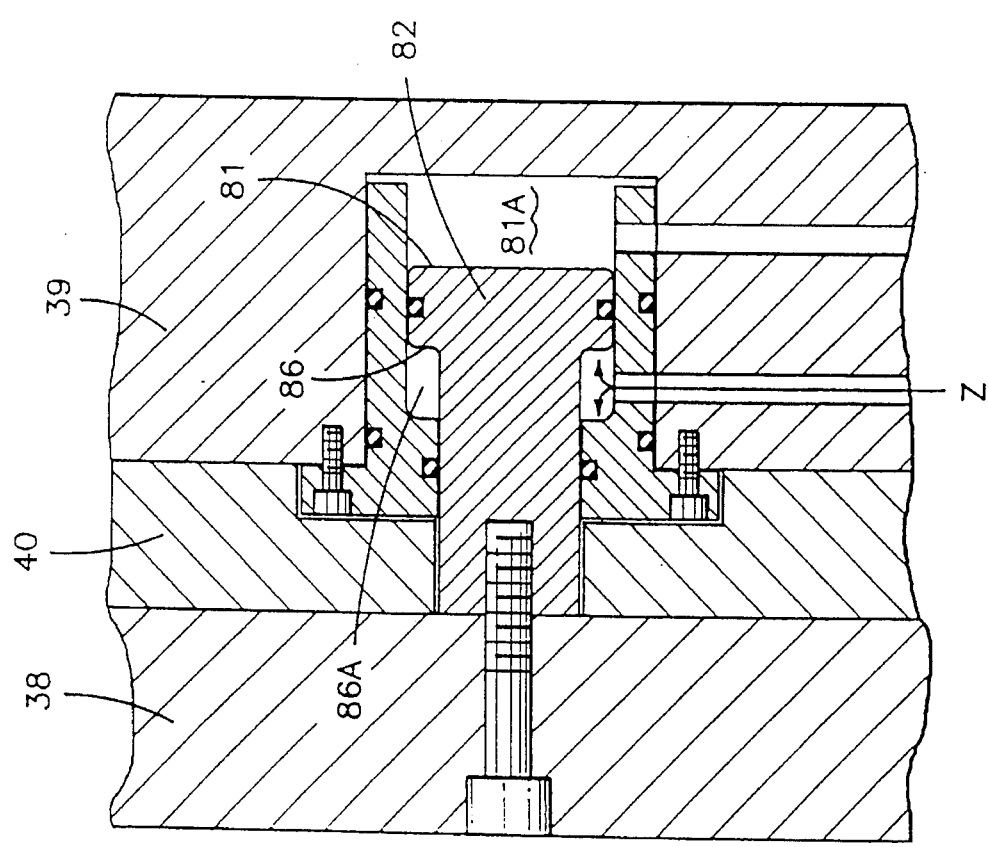

The operation and detail of piston 82 and cam 74 will be described below. Since the stripper ring 36 is supported and held between bearing plates 38 and 40, it is necessary to move these two plates away from core plate 39 in timed relationship with the rotation of the stripper ring 36 to eject the molded article. To achieve this, air pressure is supplied to first face 81 of fixed piston 82 in the direction of arrow X into chamber 81A which adjoins first face 81, see FIG. 8. The air pressure in the direction of arrow X acts on bearing plates 38 and 40 and moves plates 38 and 40 away from fixed core plate 39 enlarging chamber 81A as shown in FIG. 8. However, the movement is restricted by face 84 of cam 74 which is associated with plate 39 and face 85 of cam follower 83 which is associated with plate 40. As previously described, the movement is slight and merely permits a small clearance between the core and stripper ring. As cam 74 moves upwardly in the direction of arrow Y as shown in FIGS. 4A, 4B and 4C, inclined face 84 of cam 74 permits separation of plates 38 and 40 from plate 39 as shown in FIG. 8 with space 90 between these plates. The angle of cam face 84 and cam follower face 85 is designed such that the vertical distance moved by rack 64 (and consequently cam 74) to produce exactly one rotation of stripper ring 36, will also permit a horizontal movement of cam follower 83 and therefore to stripper ring 36 equal to the pitch of the thread on the molded part 14. At the end of the stroke, the parts will have fallen off and the mold is ready for closing. Air pressure is then switched to second face 86 of piston 82 in the direction of arrow Z into chamber 86A urging plates 38 and 40 towards plate 39 as shown in FIG. 7 by enlarging chamber 86A and moving plates 38 and 40 in the opposite direction shown in FIGS. 4A and 4B. This can be done when the mold is closing as the cam and cam follower faces are not restricted from separating and are independent in this direction of motion. Therefore, it is not necessary to wait for cam 74 to return to the original position. This should be contrasted to the usual method of using a cam to push the plate mechanically forward by wedging itself between two plates. Of course, in that device, it would be mandatory to wait for the cam (wedge) to be repositioned to allow the return of plate 38 and 40 for the closing operation of the mold to commence. Rollers 87 are used to provide back-up support for the cams.

Figure 9:
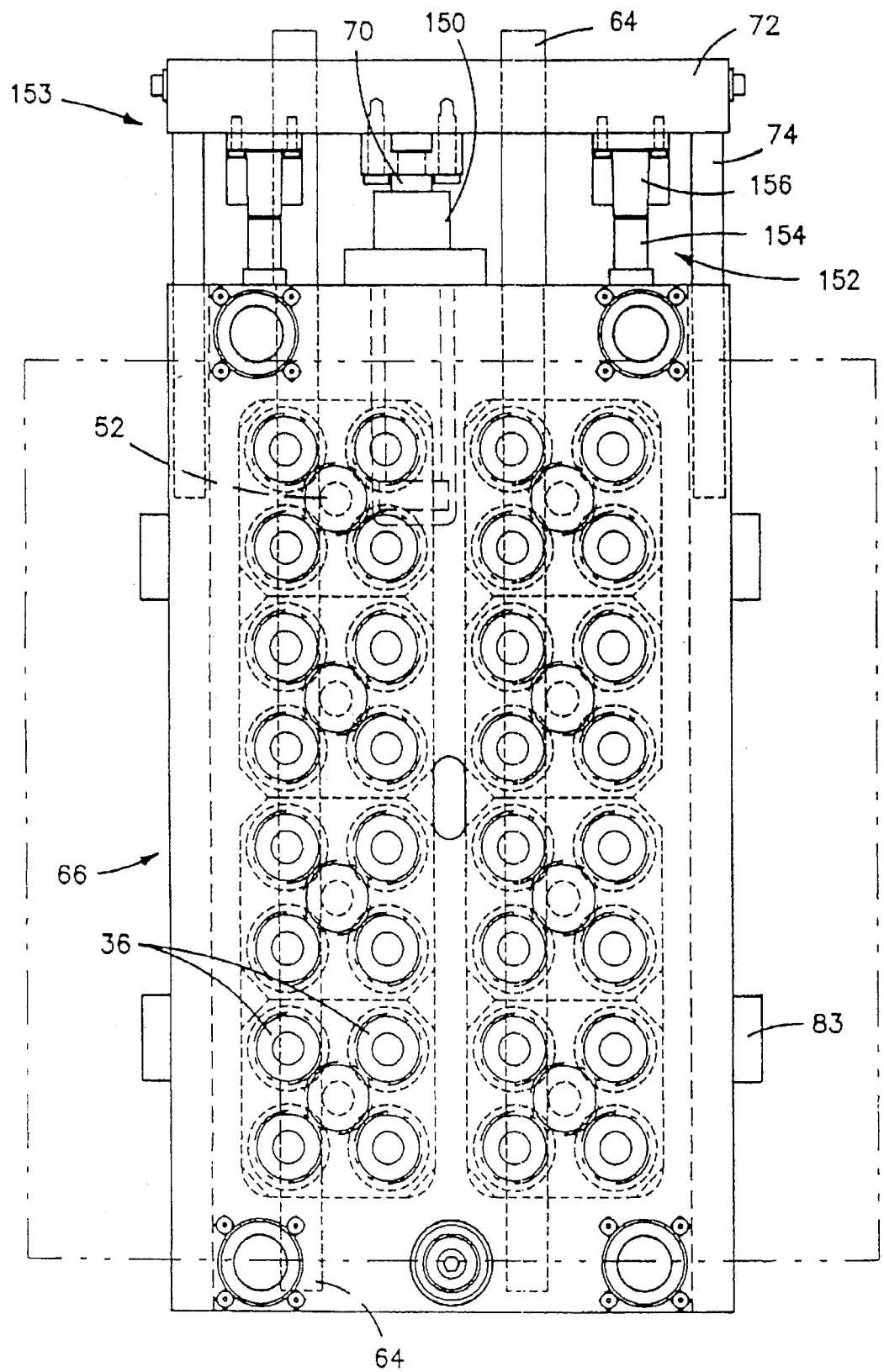
FIG. 9 is a front elevational view of a 32 mold cavity layout using the assembly of FIG. 1 and showing a camming mechanism for actuating the same, in accordance with the principles of the present invention.

Referring to FIG. 9 which is a view similar to FIG. 3, racks 64 are reciprocated by two sources, an initial source which is camming mechanism 152, which is driven by motive means 34 (shown in FIG. 1), for the first quarter of the ejection process, and a secondary source, which is a pneumatic cylinder 150, for the remaining three quarters of the ejection process. Camming mechanism 152 functions to initiate the ejecting process by breaking the molded articles loose from the mold core, while the cylinder 150 completes the ejection process by continuing the rotation of the article after the initial break. FIG. 3, on the other hand, shows an example of a system 210 using only one power source, a hydraulic cylinder 212, for the entire ejection process. Due to the need for a strong initial breaking force for overcoming the sticking of the molded article to the mold, a large and forceful hydraulic cylinder 212 is used. Hydraulic cylinder 212 provides force after the initial break which is usually excessive for the remaining portion of the ejection process. However, with camming mechanism 152, the smaller pneumatic cylinder 150 can be used which, as shown in FIG. 9, occupies much less room and allows the top portion 153, to be much smaller in scale, particularly height, than a similar top portion 214 shown in FIG. 3, necessarily using much larger cylinder 212.

Figure 10A:
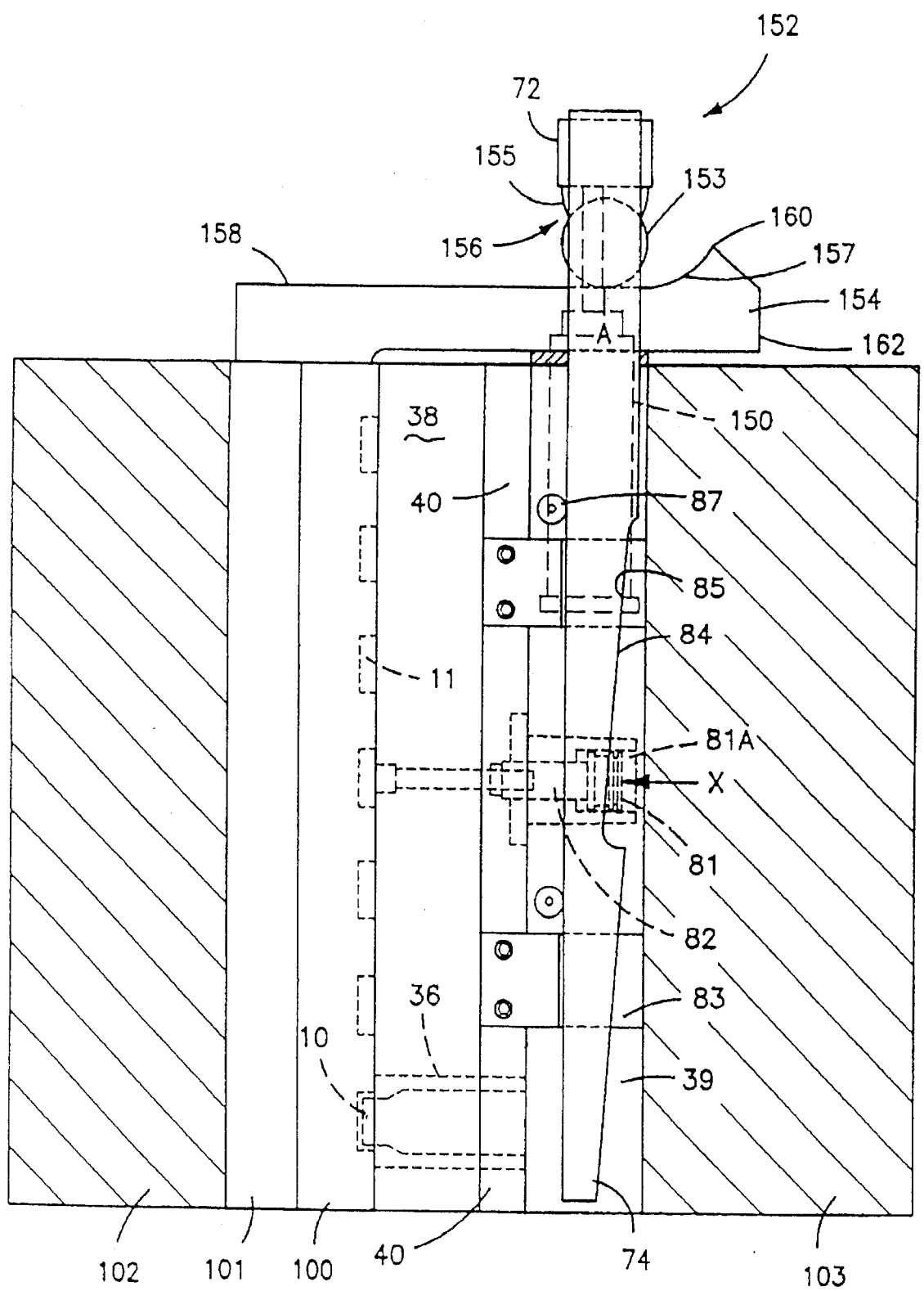
FIG. 10A is a side elevational view of the mold in a mold closed position showing the camming mechanism used for assisting and ejecting the molded article.
Figure 10B:
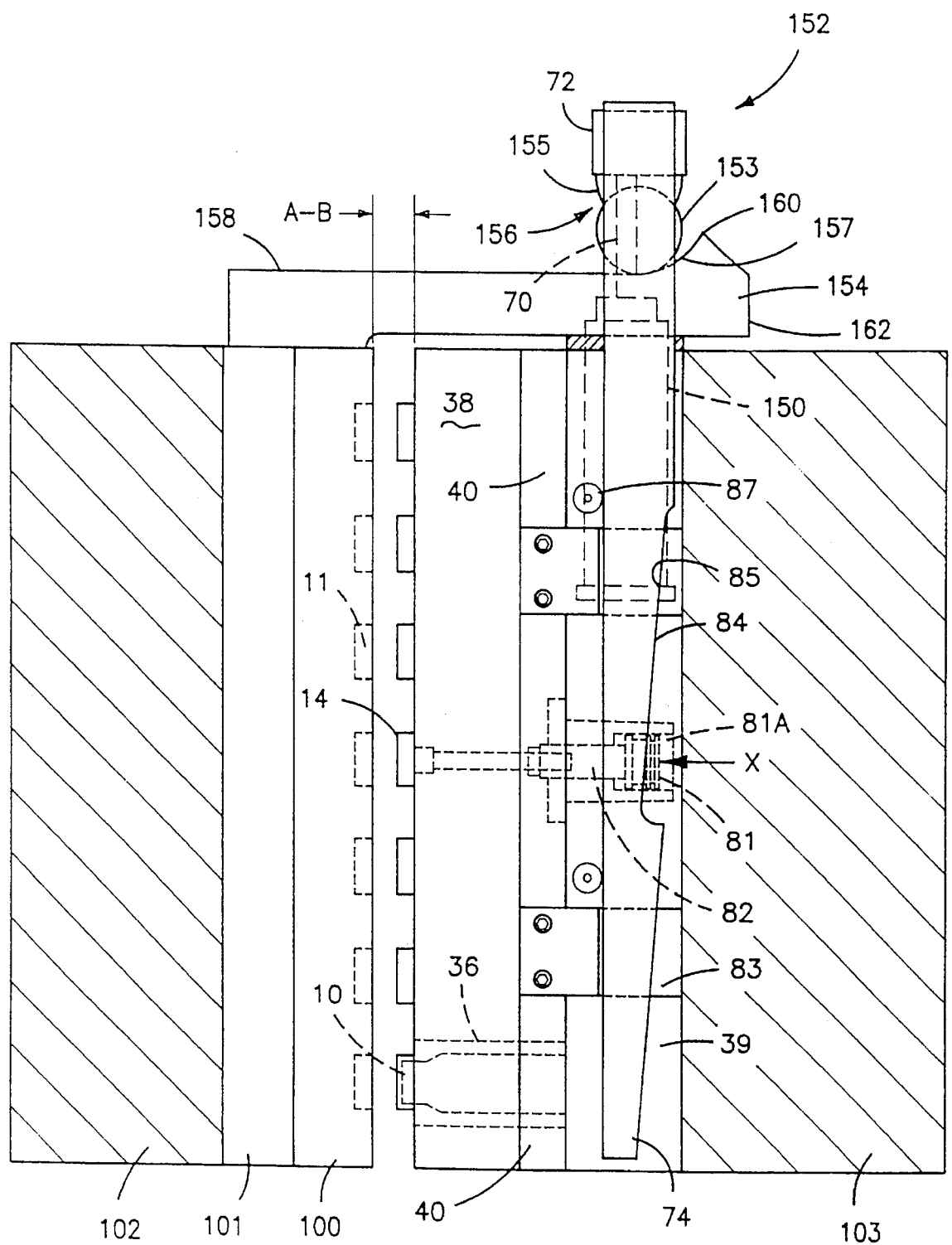
FIG. 10B is similar to FIG. 10A wherein the mold is starting to open and a cam following mechanism is functioning to assist in initiating the ejection process.
Figure 10C:
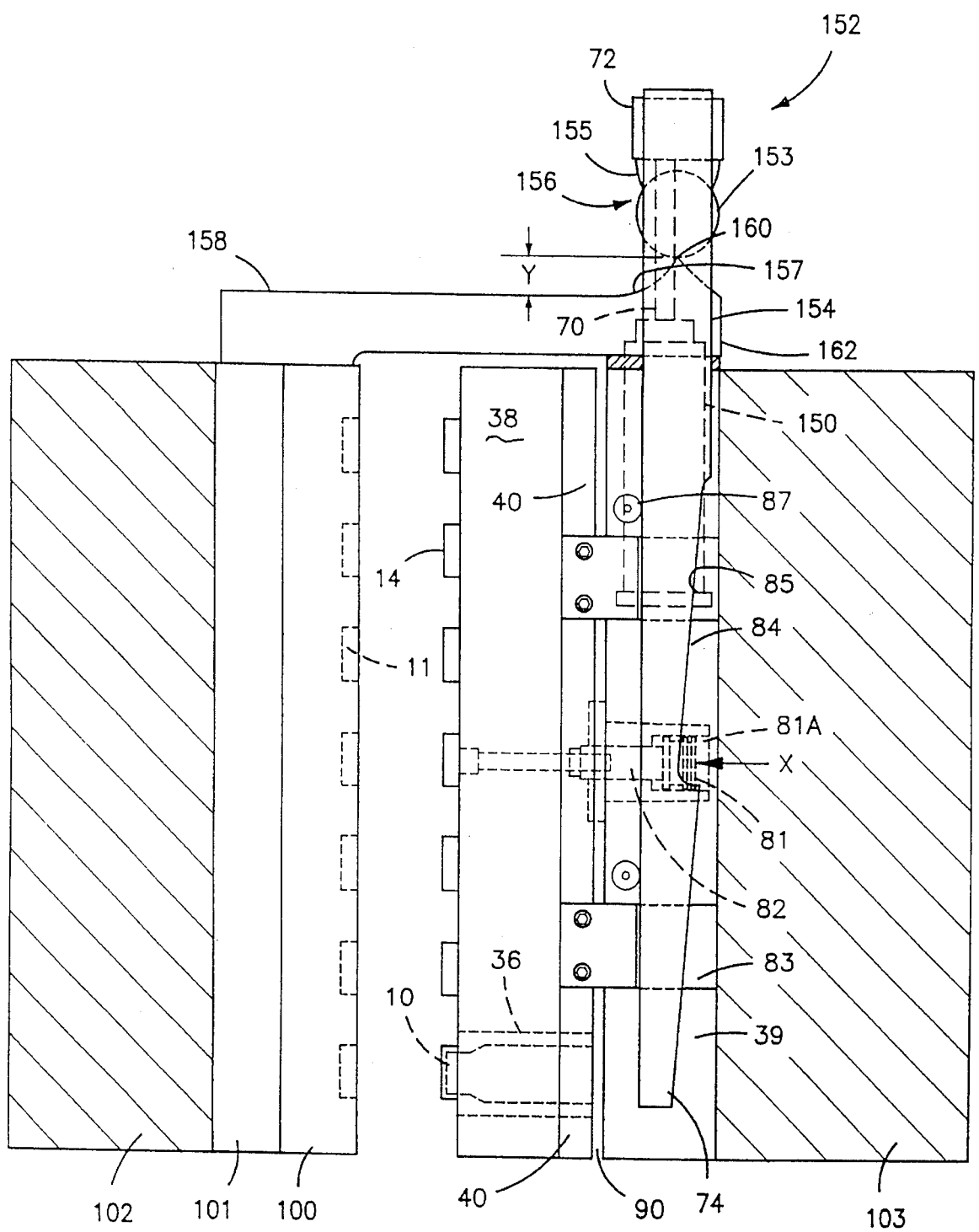
FIG. 10C is a view similar to FIG. 10B wherein the mold is in the open position and the cam following mechanism has completed movement for the initial ejection process.

As shown in FIGS. 10A, 10B and 10C, camming mechanism 152 includes a cam 154 and a cam following mechanism 156. Cam 154 is bolted or otherwise connected to mold cavity plate 100 and mold manifold plate 101. Cam 154 extends substantially horizontally over core plate 39 and may extend with the mold in the mold closed position over machine platen 103. Cam following mechanism 156, comprised of roller 153 and bracket 155, is attached via the bracket 155 and fasteners or the like, to the lower surface of crossmember 72. Cross member 72 is fastened to racks 54 (see FIG. 3) and vertical cams 74, which function to turn article 14 away from core 10 and separate plates 38 and 40 from core plate 39, respectively. With the attachment of racks 64 (see FIG. 9) and cam 74 to cross-member 72, the movement of cam following mechanism 156 along cam 154 effectuates motion to both elements, cam 74 and racks 64.

Figure 10D:
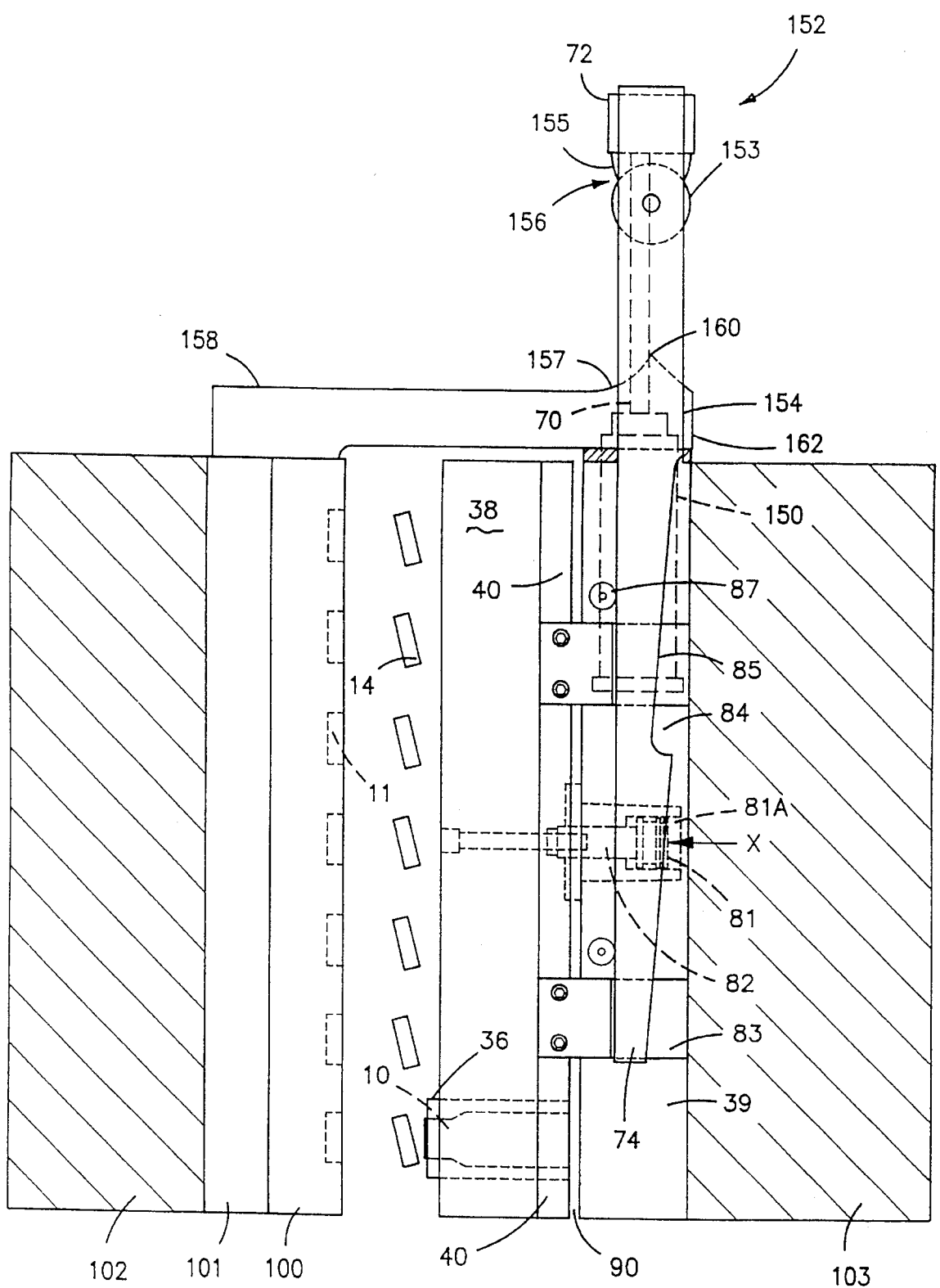
FIG. 10D is a view similar to FIG. 10C with the mold in the open position, showing a cylinder providing power for completing the ejection process.

In the mold closed position, as shown in FIG. 10A, cam following mechanism 156 rests on the horizontal portion of cam surface 158 of cam 154 immediately adjacent inclined surface 157. Referring to FIG. 10B, at about the ¾ length point of surface 158, the cam begins to extend angularly upward via inclined surface 157 to a rounded peak 160, which peak 160 is adapted to be moved into alignment with cylinder 150 and cylinder rod 70, during movement of cam 154 and plate 101. Cam surface 158 then continues downward on an angle to a distal edge 162. The height and angular configuration of inclined surface 157 of cam 154 leading to peak 160 is designed such that camming mechanism 152, following this surface, functions to move rack 64 (see FIG. 3) a distance which turns stripper ring 36 approximately 45°. Referring to FIG. 10C, the force applied during this 45° displacement is sufficient to initially break molded article 14 from core 10. When peak 160 is reached by cam following mechanism 156, piston 150 takes over and completes the upward motion of cam following mechanism 156, driving rod 70, cross member 72 and racks 64 (not shown) upward, rotating the stripper ring (not shown) and ejecting molded articles 14, as shown in FIG. 10D.

In operation, once the plastic has been injected and solidified, as shown in FIG. 1, the mold opens via motive means 34 to move female mold 11 away from mold core 10, as shown in FIG. 2, and the mold assembly 1 assumes the mold open position with the molded article 14 remaining on the core. As shown in FIG. 1, stripper ring 36 preferably forms a part of the base of mold cavity 12 in the mold closed position and contacts the base of the skirt 22 of molded article 14. Alternatively, one can employ variations such as shown in FIGS. 5 and 6.

FIGS. 10A–10D show side views of the layout of FIG. 9 in various stages of operation. The rack 64 (shown in FIG. 9), cam 74 (both associated with camming mechanism 152 and pneumatic cylinder 150) and fixed pneumatic piston 82 (see the enlarged detail views of FIGS. 7 and 8) are then activated substantially simultaneously, or preferably with the pneumatic piston activated slightly before to affect a small clearance between the core and stripper ring, to turn the pinion 62 (see FIG. 9) and stripper ring 36 and advance stripper ring 36 forward at a predetermined rate governed by the angle of cam face 84 as it slides against cam 83.

Initially, the high force turning of pinion 52 (see FIG. 9) and advancement of stripper ring 36 is effected by camming mechanism 152, as shown in FIGS. 10A and 10B. By using the opening force of motive means 34 (see FIG. 1), the upward movement of camming mechanism 152 functions to initiate the ejection of the molded article 14 from mold core 10. Because the initial breaking of article 14 from mold core 10 requires a greater force than the subsequent ejection procedure, pneumatic cylinder 150, which provides less force than the camming mechanism 152, can be used to finish the ejection process. If desired, a hydraulic cylinder may be employed with the advantage of additional reduction in size.

Figure 11:
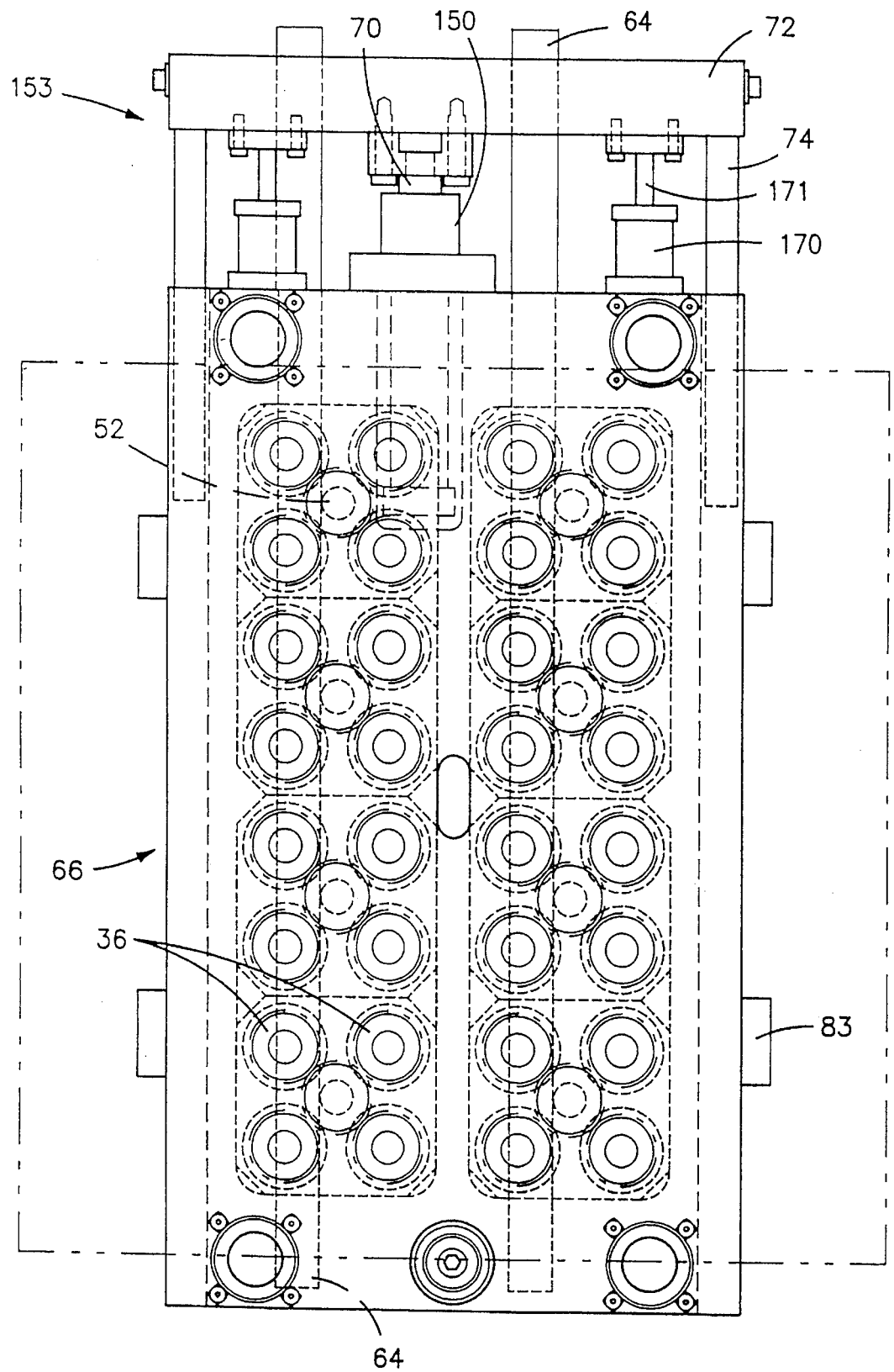
FIG. 11 is a view similar to FIG. 9 showing an alternate embodiment.

Alternatively, as shown in FIG. 11, the camming mechanism 152 (see FIG. 9) may be substituted with pneumatic cylinders or hydraulic cylinders 170 with a substantially reduced piston rod 171 as compared to cylinder 150. The reduced cylinder height and compact size permits additional room for other mold components.

Camming mechanism 152 is designed so that there will be no vertical lift imparted to cam following mechanism 156, rack 64 (see FIG. 9) and cam 74, and consequently no rotation of stripper ring 36, until the mold has opened a sufficient distance. This distance is indicated as A-B in FIG. 10B and is such that the threaded molded article 14 will not begin turning away from mold core 10 for subsequent ejection until it has been cleared away from female mold 11.

As the motive means begins to move the female mold away from mold core 10, the horizontal surface of cam 154 begins to move underneath cam following mechanism 156, as shown in FIGS. 10A–10C. However, power is not transferred via racks 64 and pinions 52 until cam following mechanism 156 is directed up inclined surface 157, as shown in FIG. 10B. That is, the movement of cam 154 does not impart vertical movement to cam following mechanism 156 until plates 38 and 100 have separated distance A-B so as to enable article 14 to freely fall between plates 38 and 100. The actual ejection process is initiated by the power of motive means 34 (see FIG. 7) when cam following mechanism 156 is forced up inclined surface 157.

As plates 38 and 100 continue to separate, inclined surface 157 directs cam following mechanism 156 upward to initiate movement of vertical cam 74 and rack 64 (see FIG. 9). One result of the upward movement of cam following mechanism 156, is that rack 64 imparts rotation to stripper ring 36 which subsequently imparts rotation to molded article 14.

As shown in FIG. 10C, cam following mechanism 156 moves to the maximum vertical peak 160, which motion causes approximately the first 45° of rotation of molded article 14. At the same time or immediately following the lifting initiated by the camming mechanism 152, cylinder 150, having cylinder rod 70 attached to center cross-member 72, is actuated for completing the ejection process. Accordingly, and referring to FIG. 10D, lift cylinder 150 continues the momentum generated by camming mechanism 152 and fully extends stripper ring 36, thereby ejecting molded articles 14. As a consequence of camming mechanism 152 performing the most forceful function of the ejecting process, the initiation of the rotation of stripper ring 36 and overcoming any sticking or gripping of molded article 14 to core 10, cylinder 150 can be more compact and arranged in more space efficient manner than previously obtainable with similar ejection mechanisms.

While camming mechanism 152 has been described for use with a stripper ring, this supplementary force actuating mechanism may be used with other types of molds and ejection systems which rotate the core portion of the mold instead of using a stripping ring. Even more broadly, the supplementary camming mechanism can be used with any ejection system which reciprocates racks or cams and could benefit from a boost in starting the ejection motion.

Referring still to FIGS. 10A–10D, the effect of pneumatic piston 82 is to hold cam face 84 in contact with cam follower 83. A slight clearance between the cam and cam follower in their initial position will allow the pneumatic piston to initiate clearance between the core and stripper ring before rotation begins. Cam follower 83 is fixed to the rear bearing plate 40 as shown in FIGS. 3 and 10A. This action serves to control the unscrewing of article 14 from mold core 10. FIG. 2 shows stripper ring 36 in its forward position with article 14 released from core 10 by rotation thereof in the direction of arrow C. The stripper ring and mold can now be returned to their mold closed position independent of the rack and cam following mechanism as shown in FIG. 5, saving time in the operation. If the pneumatic piston 82 has not been energized to move the stripper ring back before the mold closes, no damage will occur due to the compressive spring nature of the pneumatic piston 82. As the rack-cam assembly moves back to its home position, clutch 60 allows the stripper ring to remain stationary without rotation thereof and without the resultant wear between gear teeth or mold shut-off surfaces 76, 78.

The operation and detail of piston 82 and cam 74 will be described below. Since the stripper ring 36 is supported and held between bearing plates 38 and 40, it is necessary to move these two plates away from core plate 39 in timed relationship with the rotation of the stripper ring 36 to eject the molded article, as shown in FIGS. 10C and 10D. To achieve this, air pressure is supplied to first face 81 of fixed piston 82 in the direction of arrow X into chamber 81A which adjoins first face 81, see FIG. 8. The air pressure in the direction of arrow X acts on bearing plates 38 and 40 and moves plates 38 and 40 away from fixed core plate 39, see FIG. 10C, enlarging chamber 81A as shown in FIG. 8. However, the movement is restricted by face 84 of cam 74 which is associated with plate 39 and face 85 of cam follower 83 which is associated with plate 40. As previously described, the movement is slight and merely permits a small clearance between the core and stripper ring. As cam 74 moves upwardly in the direction of arrow Y as shown in FIGS. 10C–10D, inclined face 84 of cam 74 permits separation of plates 38 and 40 from plate 39, with space 90 between these plates. The angle of cam face 84 and cam face 85 is designed such that the vertical distance moved by rack 64 (and consequently cam 74) to produce exactly one rotation of stripper ring 36, one quarter of which is initiated by camming mechanism 152, will also permit a horizontal movement of cam follower 83 and therefore to stripper ring 36 equal to the pitch of the thread on the molded article 14. At the end of the stroke, the parts will have fallen off and the mold is ready for closing. Air pressure is then switched to second face 86 of piston 82 in the direction of arrow Z into chamber 86A urging plates 38 and 40 towards plate 39 as shown in FIG. 7 by enlarging chamber 86A and moving plates 38 and 40 in the opposite direction, as shown in FIGS. 7 and 10A. This can be done when the mold is closing as the cam and cam faces are not restricted from separating and are independent in this direction of motion. Therefore, it is not necessary to wait for cam 74 to return to the original position. This should be contrasted to the usual method of using a cam to push the plate mechanically forward by wedging itself between two plates. Of course, in that device, it would be mandatory to wait for the cam (wedge) to be repositioned to allow the return of plate 38 and 40 for the closing operation of the mold to commence. Rollers 87 are used to provide back-up support for the cams.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for forming a threaded molded plastic article with an outer surface thereof which comprises:

a female mold having a surface for the formation of the outer surface of said molded plastic article;

a mold core having an external core surface cooperating with said female mold to form a mold therebetween, said mold having a mold closed position and a mold open position, said mold core and female mold forming a mold cavity in the mold closed position, said mold core being so constructed to form a threaded inner surface of said molded article in the mold closed position;

means for injecting plastic material into said mold cavity;

means for relatively moving said female mold to a position spaced from the mold core to space the female mold from the molded article and form said mold open position; and means to remove the molded article from the mold core including a clutch, operative to provide rotational driving forces to the molded article in one direction only.

2. Apparatus according to claim 1 wherein the molded article is a threaded closure with an upper portion and a skirt portion thereof depending therefrom and wherein the means to remove the molded article includes means to rotate said mold core.

3. Apparatus according to claim 1 including a stripper ring adjacent the external core surface, wherein said means to remove includes a driving means connected to and for rotational driving of at least one of said core and said stripper ring.

4. Apparatus according to claim 3 wherein said driving means includes a rack which in turn drives one of said stripper ring and said core and means to reciprocate the rack, whereby the stripper ring is moved axially relative to the core from a rearward to a forward position thereof to remove the article from the core and is returned to the rearward position thereof.

5. Apparatus according to claim 4 including a plurality of cores and associated stripper rings, wherein one rack is engagable with at least one of a group of cores and a group of stripper rings.

6. Apparatus according to claim 4 including a cam connected to the rack and spaced therefrom, wherein the cam and rack are operative to move together.

7. Apparatus for forming a threaded molded plastic article with an outer surface thereof which comprises:

a female mold having a surface for the formation of the outer surface of said molded plastic article;

a mold core having an external core surface cooperating with said female mold to form a mold therebetween, said mold having a mold closed position and a mold open position, said mold core and female mold forming a mold cavity in the mold closed position, said mold core being so constructed to form a threaded inner surface of said molded article in the mold closed position;

means for injecting plastic material into said mold cavity;

means for relatively moving said female mold to a position spaced from the mold core to space the female mold from the molded article and form said mold open position; and removal means for removing said article from said mold core, including a cam, wherein the cam provides a restriction to the forward movement of the removal means but does not restrict rearward movement of the removal means.

8. Apparatus according to claim 7 wherein the cam is connected to a rack and spaced therefrom, the cam and rack being operative to move together while still permitting limited axial movement of the removal means independent of the stroke of said cam and said rack.

9. Apparatus according to claim 8 including initial source means providing power to break said article loose from the mold corer and secondary source means providing power to finish the election of said article after said article is broken loose from the mold core, wherein the initial source means is operative to be energized independent of the relative position and movement of the female mold and mold core.

10. Apparatus according to claim 9 wherein said initial source means comprises at least one piston in addition to said secondary source means.

11. Apparatus according to claim 7 including a stripper ring which contacts said mold core wherein said restricted forward movement relieves at least a portion of said contact between said mold core and said stripper ring prior to rotation of at least one of said mold core and said stripper ring.

12. Apparatus for forming a threaded molded plastic article with an outer surface thereof which comprises:

a female mold having a surface for the formation of the outer surface of said molded plastic article;

a mold core having an external core surface cooperating with said female mold to form a mold therebetween, said mold having a mold closed position and a mold open position, said mold core and female mold forming a mold cavity in the mold closed position, said mold core being so constructed to form a threaded inner surface of said molded article in the mold closed position;

means for injecting plastic material into said mold cavity;

means for relatively moving said female mold to a position spaced from the mold core to space the female mold from the molded article and form said mold open position;

removal means for removing said article from said mold core, including a cam, wherein the cam provides a restriction to the forward movement of the removal means but does not restrict rearward movement of the removal means; and including initial source means providing power to break said article loose from the mold core, and secondary source means providing power to finish the ejection of said article after said article is broken loose from the mold core, wherein the initial source means is operative to be energized independent of the relative position and movement of the female mold and mold core.

13. Apparatus according to claim 12 wherein said initial source means comprises at least one piston in addition to said secondary source means.

* * * * *